April 30, 1929. M. F. CARR 1,711,455
MACHINE FOR MAKING SEPARABLE FASTENER STUDS
Original Filed Nov. 1, 1924 3 Sheets-Sheet 1
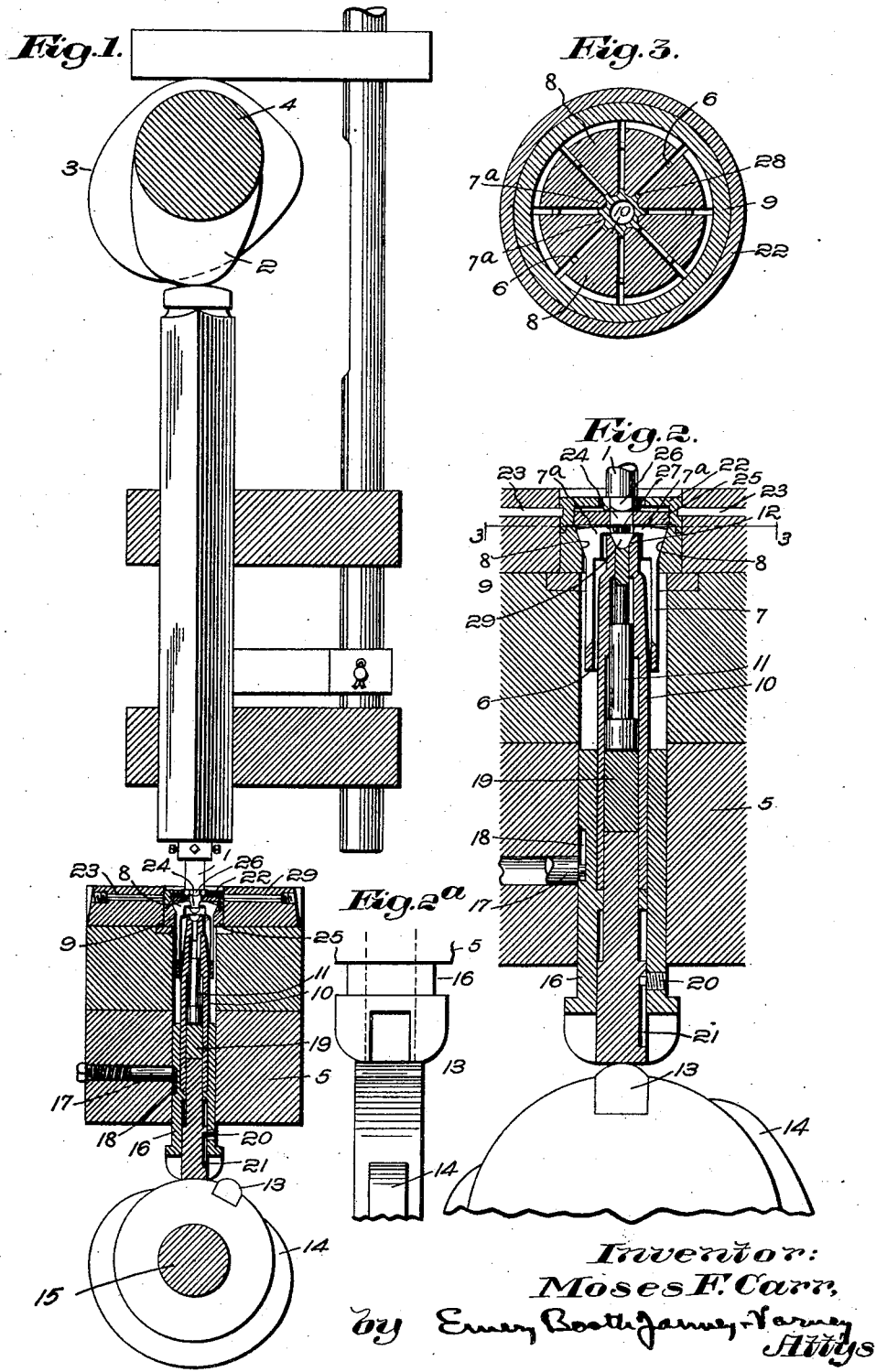

April 30, 1929.                M. F. CARR                 1,711,455
MACHINE FOR MAKING SEPARABLE FASTENER STUDS
Original Filed Nov. 1, 1924    3 Sheets-Sheet 2
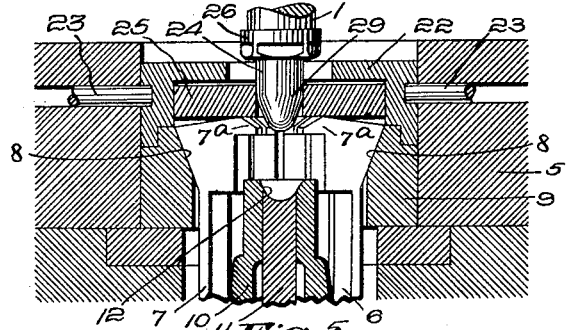
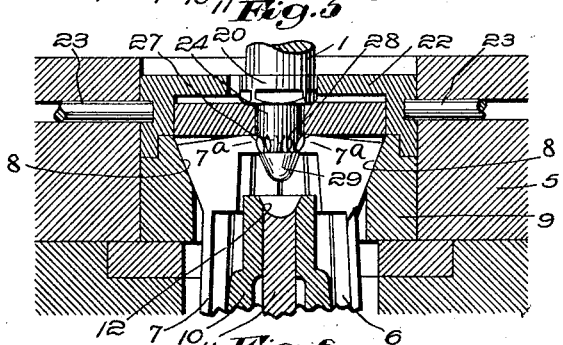
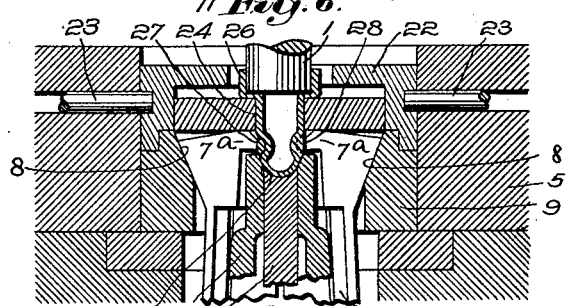
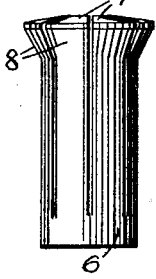
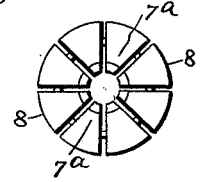
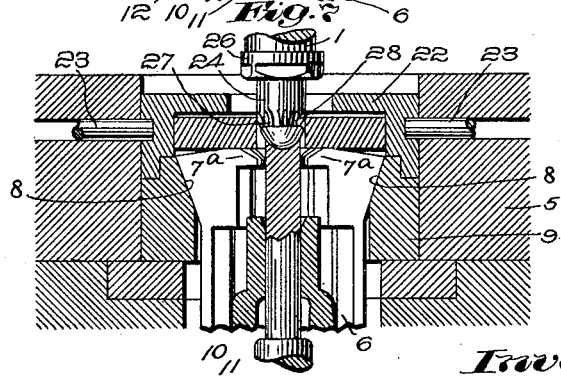

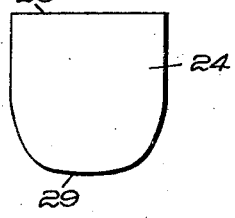
Fig. 10.
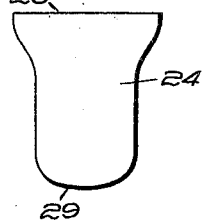
Fig. 11.
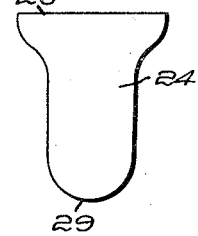
Fig. 12.
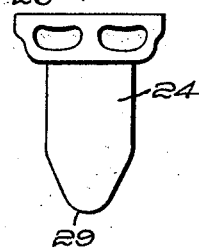
Fig. 13.
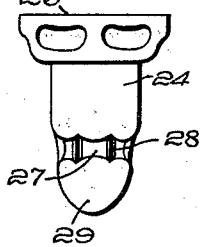
Fig. 14.
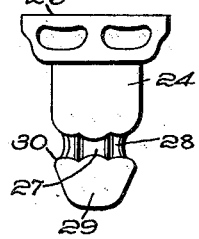
Fig. 14ª.
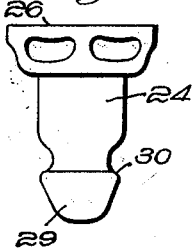
Fig. 15.
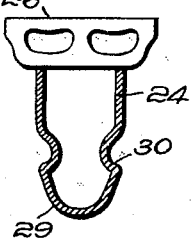
Fig. 16
Inventor:
Moses F. Carr,
by Emery Booth Janney + Varney
Attys.

Patented Apr. 30, 1929.

1,711,455

UNITED STATES PATENT OFFICE.

MOSES F. CARR, OF LEXINGTON, MASSACHUSETTS, ASSIGNOR, BY MESNE ASSIGNMENTS, TO CARR FASTENER COMPANY, A CORPORATION OF MASSACHUSETTS.

MACHINE FOR MAKING SEPARABLE FASTENER STUDS.

Original application filed November 1, 1924, Serial No. 747,231. Divided and this application filed August 25, 1925. Serial No. 52,329.

This invention aims to provide an improved machine for making separable fastener studs.

The application is a division of my prior application, Serial No. 747,231, filed November 1, 1924.

In the drawings, which illustrate a preferred embodiment of my invention:—

Figure 1 is a vertical section, partly in elevation, through a portion of a machine in which the studs are formed;

Fig. 2 is a fragmentary section, partly in elevation, showing one of the forming dies of the machine in position for forming the shoulder on the stud;

Fig. 2ª is a fragmentary elevation view of a portion of the "bumping" mechanism, and the cams for operating the same;

Fig. 3 is an enlarged section on the line 3—3 of Fig. 2;

Fig. 4 is an enlarged fragmentary view of the upper portion of the die shown in Figs. 1 and 2, showing the position of the parts of the die when the stud is being entered therein;

Fig. 5 is a view of the parts shown in Fig. 4, showing the method of forming the neck of the stud;

Fig. 6 shows the relation of the parts, shown in Fig. 4, when forming the shoulder on the stud;

Fig. 7 is a view of the parts as shown in Fig. 4, but showing the stud being ejected from the die;

Fig. 8 is a side elevation of the chuck;

Fig. 9 is a plan view of the chuck;

Figs. 10 through 15 are views showing progressive stages in the drawing or pressing of the stud; and Fig. 16 is a sectional view of the completed stud.

Referring to the drawings, I have shown a fastener stud which includes a head, a neck and a shank portion, formed by passing an appropriate piece of metal through a special series of stamping or pressing operations. The drawings illustrate the various positions of the neck forming portions of the machine during the neck and shoulder forming operations, and the various forms that the single piece of metal is pressed into until it has become a completed stud.

In carrying out my invention, I first form a neckless shell (Fig. 13) substantially as in usual methods of making a stud of the same general type, but I then utilize a preferred novel method of forming the neck and shoulder of the stud by a special series of operations, preferably in the same machine as that in which the neckless stud is formed. It has been the usual practice heretofore to roll the neck into the shell, an operation which weakens the stud, particularly where a relatively abrupt shoulder is provided in advance of the neck.

The only parts of my multiple press or eyelet machine which I have illustrated are those parts necessary for a complete understanding of my invention, and therefore Fig. 1, as illustrated, shows only the means by which the neck and shoulder of the stud are formed.

The apparatus for forming the neck and shoulder in the neckless stud comprises a stud carrying plunger 1, which may be operated by any suitable means, such, for instance, as by the cams 2 and 3 located upon the shaft 4, which raise and lower the plunger so as to deliver a neckless shell to the forming die located in the bed 5 of the machine. The die may be of any suitable construction for compressing a neck in the stud and bumping a shoulder between the head and neck, but I prefer to provide a die or chuck 6 (Figs. 1 through 9), which is formed from a single piece of metal slotted to provide a plurality of spring fingers 7 presenting jaws 7ª for laterally compressing a neck in the previously neckless shell. The chuck 6 is also provided with tapered portions 8 at the upper ends of the spring fingers which cooperate with the cam piece 9 to force the jaws inwardly during lateral compression of the neck, and the chuck is also hollowed to permit passage within the chuck of the "bumping" mechanism for forming the shoulder on the stud. This "bumping" mechanism comprises (Fig. 1) a sleeve 10 surrounding a stud ejecting plunger 11 and presenting a recess 12 for receiving the head of the stud during the bumping operation. The means for operating the "bumping" mechanism and the ejecting plunger 11 comprise a cam 13 (Figs. 2 and 2ª) for moving the sleeve 10 and plunger 11 toward the stud as a unit, and the cam 14 which operates only upon the plunger to eject the stud from the die, both the cams 13 and 14 being rotated by the shaft 15.

The bumping and ejecting mechanism, as shown in Figs. 1 and 2, is mounted in the bed 5 of the machine and the sleeve 10 is carried by a plunger 16 which is operated by the cam 13 to move the sleeve 10 into engagement with the head of the stud, as more fully hereinafter described. The plunger 16 is held in the bed 5 by a spring-pressed pin 17, which cooperates with a slot 18 in the plunger and also acts as a stop to limit the movement of the sleeve 10 during the "bumping" operation. The ejecting plunger 11 may be made from a single piece of metal, but I prefer to make it of three pieces as illustrated, so that, in case of wear on the parts, the upper end of the plunger 11 may be kept in the proper relation to the recess 12 in the sleeve 10. This is effected by providing, between the upper and lower parts of the plunger 11, a replaceable spacer 19, which may be accurately ground to provide the desired adjustment for the plunger. Thus, after the top or bottom of the plunger 11 has become worn, the substitution of a slightly longer spacer 19 will effect a quick and economical repair. The plunger 11 is maintained in the proper relation to the sleeve 10 and plunger 16 by a set screw 20 screwed into the plunger 16 (Figs. 1 and 2) and cooperating with a slot 21 in the lower part of the ejecting plunger 11 to limit the movement thereof relative to the rest of the mechanism.

Having thus described the relevant parts of the preferred machine, I will now describe the specific operation of the parts of the apparatus illustrated in practising the preferred method of forming the neck and shoulder of the stud, which is best illustrated in Figs. 4 through 7. A neckless shell comprising a shank 24 and a base 26 is first carried downwardly by the plunger 1 toward the die or chuck 6 and through a die retaining plate 22 held in place by screws or pins 23. Then the shank 24 of the shell passes through a second aperture in a movable disc 25 seated upon the upper end of the chuck, as best illustrated in Fig. 4. As the shell is carried downward, the base portion 26 thereof seats against the disc 25 and further downward movement of the plunger 1 forces the disc downwardly, in turn forcing the die or chuck downwardly, thereby moving the chuck relative to the cam piece 9. This movement of the chuck, therefore, forces the spring jaws 7ᵃ of the chuck inwardly against the shank thereby to laterally compress indentations 27 in the shank 24 of the shell, which has previously passed between the jaws. Thus, as illustrated in Fig. 5, the neck is formed in the stud and a plurality of reinforcing ribs or struts 28, being the metal squeezed in the slots between the jaws, form supports connecting the head 29 of the stud with the shank 24. This provides a stud head having a relatively sloping shoulder rearwardly thereof, forming the front wall of the neck, as shown in Fig. 14. While the jaws 7ᵃ still engage the stud and the plunger 1 back supports the stud, the cam 13 moves the sleeve 10 and ejecting plunger 11 quickly toward the head of the stud and strikes it a sharp blow (Fig. 6), which however is limited in its movement as described, so as to move the head toward the shank of the stud and form, from the previously relatively sloping shoulder (Fig. 14), a relatively abrupt shoulder 30 between the head and neck of the stud, as best illustrated in Fig. 14ᵃ. During the last mentioned operation, the head of the stud enters the recess in the sleeve 10 so as to retain its shape during the "bumping" operation, and the struts spaced about the neck oppose collapsing of the neck. The final operation includes withdrawal of the sleeve 10 from the head of the stud, upward movement of the plunger 1, thereby releasing the jaws 7ᵃ from engagement with the stud and finally ejecting the stud from the dye by upward movement of the ejecting plunger 11 caused by rotation of the cam 14, as best illustrated in Fig. 7.

The stud is delivered from the above mentioned operations with the struts 28 still intact, as best shown in Fig. 14, and these struts are preferably removed by placing the studs into a rolling device which chips or rolls the struts 28 from the periphery of the neck and produces a stud in which the walls of the neck, the shoulder and the head thereof are substantially as thick as the remaining portions of the stud, as best shown in Fig. 16.

This method of pressing the neck and shoulder of the stud, rather than rolling it, produces a stud which is more durable and is a more desirable product than a stud having merely a rolled neck. Heretofore, it has been the practice to fill the whole head and neck portions of a rolled stud with a solder, which, in a measure, anneals the brass, where unduly hardened by the rolling action, and strengthens the stud. When studs are made by my improved method, this soldering operation is unnecessary. Thus my improved stud is strong and durable in construction and can be manufactured less expensively and more quickly than the rolled and soldered reinforced stud heretofore produced.

While I have shown and described one embodiment of my invention, it will be understood that I have done so for purposes of clarification and not of limitation, my invention being best defined in the appended claims.

Claims:

1. A stud forming machine including stud-carrying means for receiving and holding a neckless shell, chuck means for laterally compressing a neck in the shell, and means for "bumping" a shoulder adjacent the neck after said chuck means has formed the neck therein.

2. A stud forming machine including stud-carrying means for receiving and holding a neckless shell, chuck means for laterally compressing a neck in the shell, and means for "bumping" a shoulder adjacent the neck after the said chuck means has formed the neck therein while said chuck means is still engaged with the shell.

3. A stud forming machine including stud-carrying means for receiving and holding a neckless stud, laterally movable neck-forming means for pressing a plurality of depressions in the neckless stud and "bumping" means for forming the head and shoulder on the shell after the depressions are formed in the shell.

4. A machine for making fastener studs comprising stud-carrying means adapted to receive and hold a neckless stud, a die having a plurality of movable jaws, means for moving said stud-carrying means toward said die, means whereby said jaws are moved into engagement with the neckless stud carried by said stud-carrying means to form a neck in the neckless stud and means to make more abrupt the outer shoulder on the stud resulting from the forming of the neck.

5. A machine for making fastener studs comprising stud-carrying means adapted to receive and hold a neckless stud, a die having a plurality of movable jaws, means for moving said stud-carrying means toward said die, means whereby said jaws are moved into engagement with the neckless stud carried by said stud-carrying means to form a neck in the neckless stud and means operable while said jaws are engaged with the stud to make more abrupt the outer shoulder on the stud resulting from the forming of the neck.

6. A machine for making fastener studs comprising stud-carrying means adapted to receive a neckless stud, a die having a plurality of movable jaws, means for moving said stud-carrying means toward said die, means whereby said jaws are moved into engagement with the neckless stud carried by said stud-carrying means to form a neck in the neckless stud, means operable while said jaws are engaged with the stud to make more abrupt the outer shoulder on the stud resulting from the forming of the neck, and ejecting means movable independently of said jaws for ejecting the stud from the die after said jaws have been retracted to their normal position.

7. A machine for making hollow pressed studs comprising, in combination, a stud-carrying plunger for receiving a hollow neckless stud, a chuck presenting a plurality of resilient jaws, means for moving said plunger toward said jaws thereby to move said chuck relative to a cam for moving said resilient jaws toward each other and forming a longitudinally ribbed and therefore reinforced neck in the neckless shell, and an independently acting "bumping" mechanism presenting a recess for receiving the head of the stud when said "bumping" mechanism is moved toward said stud to "bump" a relatively abrupt shoulder between the head and neck of the stud.

8. A machine for making hollow pressed studs comprising, in combination, a movable chuck presenting a plurality of resilient fingers having neck-forming jaws at the free ends thereof, a plunger for delivering a stud to said chuck means whereby movement of said plunger toward said chuck moves said jaws toward each other, "bumping" means operable toward said jaws while said jaws are urged toward each other and an adjustable ejecting plunger operable to pass between said jaws when released to their normal position for ejecting a stud from said chuck.

9. A machine for making hollow pressed studs comprising, in combination, a chuck member having a plurality of fingers presenting jaw portions, a part for imparting inward neck-forming movement to said fingers, a head-bumping part, and a relatively timed mechanism imparting initial neck-forming movement between said fingers and said head-bumping part and a subsequent movement of said head-bumping part relative to said fingers.

10. A machine for making hollow pressed studs comprising, in combination, a chuck member having a plurality of fingers presenting jaw portions, a part for imparting inward neck-forming movement to said fingers, a head-bumping part, a relatively timed mechanism imparting initial neck-forming movement between said fingers and said head-bumping part, and a subsequent movement of said head-bumping part relative to said fingers and an ejecting member for ejecting the stud from the chuck after the neck has been compressed in a neckless shell and a head "bumped" thereon.

In testimony whereof, I have signed my name to this specification.

MOSES F. CARR